United States Patent Office 2,810,699
Patented Oct. 22, 1957

2,810,699

ALUMINA STABILIZED BY HAFNIA TO RESIST ALPHA ALUMINA FORMATION

Sterling E. Voltz, Brookhaven, and Sol W. Weiler, Drexel Hill, Pa., assignors to Houdry Process Corporation, Wilmington, Del., a corporation of Delaware No Drawing. Application March 29, 1955, Serial No. 497,823

2 Claims. (Cl. 252—463)

This invention relates to contact material consisting predominantly of gamma alumina containing minor amounts of a stabilizer adapted to decrease the likelihood of formation of alpha alumina even at severe conditions at which uninhibited gamma alumina would be at least partially transformed to alpha alumina.

Gamma alumina is generally a more expensive material than alpha alumina. Accordingly, gamma alumina is generally employed only when its superior performance justifies its greater cost. By methods such as X-ray diffraction it is feasible to designate accurately the proportion of alpha and/or gamma in a particular sample. Gamma alumina designates the structure which on X-ray diffraction is identified by the combination of strong lines at 2.41, 1.98 and 1.39 angstroms, and generically covers a variety of aluminas sometimes designated as chi, eta, delta, kappa and theta. The form of alumina having the crystal structure of sapphire, ruby, thermally transformed alumina gel, emery and corundum, and having an X-ray diffraction pattern including the combination of strong lines at 3.48, 2.55, 2.08 and 1.60 angstroms is designated as alpha alumina.

Particles of contact material consisting predominantly (on a mol percent basis, and ordinarily on a weight percent basis) of gamma alumina are employed as desiccants, adsorbents, heat transfer agents, catalysts, catalyst carriers, and for other purposes. In most such uses, advantages accrue from controlling conditions (particularly temperature, pressure, steam concentration, and acid concentration) in order to avoid unduly increasing the tendency of the alumina to form alpha alumina. Many catalysts consist of a minor amount of an active component distributed on a gamma alumina carrier. Some of these active components, such as molybdenum oxides, tend to catalyze formation of alpha alumina at relatively mild conditions. Molybdena catalysts are sometimes employed under conditions favoring the formation of alpha alumina. Although it is not always feasible to preserve the gamma characteristic of the alumina carrier, still the desirability of retaining the gamma alumina structure of the catalyst carrier is recognized.

Gamma alumina may be prepared by carefully regulating the calcining of a multihydrate (alpha trihydrate, beta trihydrate, gel, and amorphous) or alpha monohydrate. Gamma alumina does not occur in nature, nor in the equilibria systems involving high temperature steam and alpha alumina. All varieties of gamma alumina are readily and irreversibly transformed to alpha alumina at temperatures below the fusion point (3704° F.).

At various temperatures within the range from about 650° to 3650° F., various forms of gamma alumina undergo the transition to alpha alumina. At substantially anhydrous, non-acidic, high pressure conditions the gamma alumina is stable at higher temperatures than under high steam pressure, high acidity, high absolute pressure, and/or other conditions adversely affecting stability. It is convenient to designate as the transition temperature the lowest temperature at which a sample of gamma alumina undergoes transition to alpha alumina at a measurable rate when conditions other than temperature are least favorable to the conversion.

Although corundum, ruby and sapphire have low surface area and little tendency toward adsorption of water, the alpha alumina resulting from the dehydration of beta monohydrate (for example, diaspore) can have a surface area as high as 85 m.²/g., and can have a significant tendency to adsorb moisture. Alpha alumina samples derived from various forms of gamma alumina have a wide range of surface areas.

The difference in structure between gamma and alpha is such that there is a very great difference in the effectiveness of gamma and alpha alumina as catalysts, catalyst carriers, desiccants, and related uses. For example, an alpha alumina having a surface area of 80 m.²/g. and an adsorbed moisture content of 0.1% is not as effective a catalyst carrier for a platinum hydrogenation catalyst as a gamma alumina having equivalent area and moisture content.

Most samples of alpha alumina have a significantly lower surface area than most samples of gamma alumina, and many inaccurate designations of a material as alpha or gamma have been based merely upon surface area measurements. However, there is a wide range of large areas (e. g. 2 to 85 m.²/g.) shared by both gamma alumina and alpha alumina.

Many inaccurate designations of a material as alpha or gamma alumina have been erroneously based upon measurements of the moisture content. Because such materials have sometimes been called partial hydrates and sometimes have been called anhydrous alumina, it is important that any description be interpreted in the light of the most reliable data on alumina, and that care be exercised to avoid being misled by the confusing terminology which has been employed in some writings.

This invention concerns the use of a minor amount of stabilizer, whereby the gamma alumina is not transformed at conditions so severe as to promote the transition of uninhibited gamma alumina. The stabilizer is conveniently considered as an agent for raising the transition temperature, but the gamma alumina materials of the present invention may be useful under conditions of acidity, humidity, etc., more severe than those employed in measuring the transition temperature.

Numerous efforts have been made to provide useful forms of gamma alumina which were resistant to formation of alpha alumina, but some of the stabilizers which have been proposed, such as minor amounts of sodium oxide and potassium oxide, have also adversely affected the properties of the alumina as a carrier and/or catalyst. The inconsistency between what might have been predicted and what results were obtained by the use of contact materials containing a minor amount of various proposed stabilizers has necessitated the approach that the prediction of the usefulness of a contemplated combination comprising a stabilizer is impossible, and that such usefulness is determinable only by empirical tests. Stabilizers for alumina carriers are even more unpredictable than the catalysts employed on such carriers.

In describing the composition of solids consisting predominantly of a mixture of oxides, it is convenient to refer to the cation percent of the various metal cations in the solid structure, thereby ignoring the effects of the oxidation-reduction states of such cations, the effects of traces of anions such as iodide ion on weight percentage relationships, and related factors, and thereby emphasizing the relative proportion of the metals present as cations in the contact materials.

In accordance with the present invention, a contact material is so prepared that it consists predominantly of gamma alumina and contains from about 0.2 to about 2.6 cation percent of hafnium ion. In certain advantageous embodiments of the invention, the gamma alumina, stabilized by from about 2 to about 26 hafnium ions per 1000 aluminum ions, is a carrier for a component (e. g. platinum or chromia) active as a hydrogenation catalyst, but this method of stabilizing the gamma alumina contact material is also useful when the contact material is employed as a carrier for other types of active catalytic components or as desiccants or the like.

Reference is made to several examples which illustrate methods of preparing and using alumina contact materials with and without the present invention.

Example I

Commercially available (Harshaw) activated alumina pellets were subjected to 1900° F. for four hours. After this accelerated aging test, the pellets were converted about 45% to alpha alumina and the residual content of gamma alumina structure was of such poor quality that the pellets were deemed deactivated.

Similar pellets in which 1.57% of the metal ions were hafnium, are prepared by impregnating commercially available activated alumina pellets with a solution of hafnium nitrate by the no excess solution technique. The impregnated pellets were dried overnight at 220° F. and then calcined to form the hafnia stabilized pellets of the present invention.

The accelerated aging test consisting of subjecting said hafnia stabilized alumina pellets to 1900° F. for four hours was satisfactory and the pellets were found to contain no alpha alumina. The 1900° F. treated hafnia stabilized pellets consisted entirely of kappa alumina, one of the modifications of gamma alumina as previously explained. The aged pellets in which 1.57% of the metal ions were hafnium were thus shown to be much more stable than commercially available alumina pellets. It was also observed that the surface area of the hafnia-stabilized alumina was more than double that of the unstabilized alumina after said identical accelerated aging tests.

A drying apparatus operates on a cyclic procedure in which a bed of gamma alumina pellets is subjected for a while to damp 60° F. air thereby warming and drying the air, then to a hot dry stream for desorbing the thus adsorbed moisture, then to a cooling step, and then again to the moisture adsorption step. Using commercially available alumina pellets, the desorbing step can be satisfactorily conducted at 550° F. in 40 minutes. Using the gamma alumina pellets containing 1.57 cation percent hafnia, the desorbing step can be satisfactorily conducted either at 550° F. in 40 minutes, or at 650° F. in 20 minutes. The use of a higher temperature for desorbing makes it feasible to complete the operation more quickly. It is not feasible to desorb ordinary alumina pellets at 650° F. because temperatures above 600° F. permanently impair the adsorptive properties of such ordinary alumina. The higher temperature stability of the hafnia-stabilized alumina of the present invention is advantageous not merely in connection with drying apparatus but also in many of the other uses for alumina contact material at temperatures above about 500° F.

Example II

Gamma alumina particles were impregnated with an aqueous solution of chromic acid and calcined. In the resulting chromia on alumina catalyst, 14.4% of the metal ions were chromium and 85.6 were aluminum. This control catalyst was compared with a catalyst characterized in that of the metal ions 1.68% were hafnium, 84.3% aluminum, and 14.0% chromium. Such chromia alumina catalyst is conveniently designated as one stabilized by 1.7 cation percent hafnium. Catalysts containing hafnia are conveniently prepared by calcining particles after impregnation with an aqueous solution of hafnium nitrate, said solution being of a volume completely adsorbed by the pellets and being of a concentration affording, in the finished catalyst, the desired concentration of hafnium ions relative to other metal ions. It is generally desirable to impregnate chromia into a hafnia stabilized alumina, rather than to impregnate hafnia into a chromia on alumina catalyst. If desired, both hafnia and chromia can be simultaneously impregnated, or all three hydrous oxides can be coprecipitated to form a composite gel which can be dehydrated to form a catalyst of the present invention.

The chromia alumina catalysts are tested at standard conditions to determine their effectiveness in dehydrogenating butane. In the standard dehydrogenation tests, normal butane is passed over the catalysts at 500 G. H. S. V. (hourly volume of gas per volume of catalyst) and at a temperature of 1075° F. for a period of 10 minutes. The catalysts are also subjected to an accelerated aging test consisting of treating the catalyst with air at 1800° F. for two hours, thereby somewhat simulating the degeneration of the catalyst activity during many months of normal dehydrogenation operation. The accelerated aging tests show that the hafnia stabilized catalyst possesses a significantly longer useful life than unstabilized chromia-alumina catalyst.

By X-ray diffraction procedures it was established that the quantity of gamma alumina in the hafnia-stabilized material after said 1800° F. treatment for two hours was about eight times that of the thus treated unstabilized chromia-alumina catalyst. Surface area measurements demonstrated that the hafnia stabilized alumina withstood said accelerated aging test satisfactorily, but that the unstabilized alumina did not.

By a series of tests similar to Examples I and II it was established that of all the metal ions in the contact material, the cation mol percent concentration of the hafnium should be within the range from 0.2 to 2.6% in order to achieve an aluminaceous material having the stability characteristics of the present invention.

Obviously many modifications and variations of the invention as hereinbefore set forth may be made without departing from the spirit and scope thereof, and therefore only such limitations should be imposed as are indicated in the appended claims.

Reference is made to an application entitled, "Alumina Stabilized by Thoria to Resist Alpha Alumina Formation" filed by the same inventors January 26, 1955, Serial No. 484,312.

What is claimed is:

1. The method of preparing contact material having the catalytic characteristics of gamma alumina and suitable as a catalyst carrier, said method consisting of the steps of: preparing particles of gamma alumina; impregnating the gamma alumina particles with a solution of hafnium nitrate providing a predetermined proportion of hafnium ions to aluminum ions; drying the impregnated particles; and calcining the dried particles to convert the hafnium nitrate to hafnium dioxide, thereby forming particles consisting principally of gamma alumina and containing for every thousand metal ions in said contact material from about 2 to about 26 hafnium ions of hafnium dioxide combined in the gamma alumina crystal lattice as a uniformly, dilutely distributed hafnium dioxide, whereby the contact material resists transformation to the alpha alumina state at elevated temperatures.

2. In the use of contact materials containing a major proportion of gamma alumina, the method of inhibiting the transformation of a contact material from gamma to alpha alumina which method consists of: impregnating gamma alumina particles with a solution of hafnium nitrate providing a predetermined proportion of hafnium ions to aluminum ions; drying the impregnated particles; and calcining the dried particles to transform the impregnated hafnium nitrate to hafnium dioxide for incorporating in the contact material a minor amount of hafnium dioxide, whereby the contact material may be subjected to more severe conditions without significant transformation to alpha alumina, the hafnium ions constituting from about 0.2 to about 2.6 cation percent of the metal ions in said contact material.

References Cited in the file of this patent

UNITED STATES PATENTS

| | | |
|---|---|---|
| 2,231,446 | Grosse | Feb. 11, 1941 |
| 2,331,292 | Archibald | Oct. 12, 1943 |
| 2,393,537 | Huffman | Jan. 22, 1946 |